(12) United States Patent
Sandhu et al.

(10) Patent No.: US 7,886,346 B2
(45) Date of Patent: Feb. 8, 2011

(54) FLEXIBLE AND ADJUSTABLE AUTHENTICATION IN CYBERSPACE

(75) Inventors: Ravi Singh Sandhu, Oak Hill, VA (US); Ravi Ganesan, Half Moon Bay, CA (US); Andrew Paul Cottrell, San Jose, CA (US); Timothy Scott Renshaw, Cumming, GA (US); Brett Jason Schoppert, Leesburg, VA (US); Kyle Austin, New York, NY (US)

(73) Assignee: VMware, Inc., Palo Alto, CA (US)

( * ) Notice: Subject to any disclaimer, the term of this patent is extended or adjusted under 35 U.S.C. 154(b) by 978 days.

(21) Appl. No.: 11/704,912

(22) Filed: Feb. 12, 2007

(65) Prior Publication Data

US 2007/0199053 A1    Aug. 23, 2007

Related U.S. Application Data

(60) Provisional application No. 60/772,566, filed on Feb. 13, 2006.

(51) Int. Cl.
*G06F 7/04* (2006.01)
*G06F 15/16* (2006.01)
*G06F 17/30* (2006.01)
*H04L 29/06* (2006.01)

(52) U.S. Cl. .................... 726/7; 726/5; 726/8; 713/153; 709/229

(58) Field of Classification Search .................... 726/7, 726/8

See application file for complete search history.

(56) References Cited

U.S. PATENT DOCUMENTS

| 7,676,829 | B1 * | 3/2010 | Gui et al. ...................... 726/5 |
| 2001/0036297 | A1 * | 11/2001 | Ikegami et al. .............. 382/115 |
| 2003/0041091 | A1 * | 2/2003 | Cheline et al. .............. 709/200 |
| 2003/0055990 | A1 * | 3/2003 | Cheline et al. .............. 709/229 |
| 2003/0079121 | A1 * | 4/2003 | Gilman et al. .............. 713/153 |
| 2006/0026671 | A1 * | 2/2006 | Potter et al. .................... 726/7 |
| 2007/0101418 | A1 * | 5/2007 | Wood et al. .................... 726/8 |
| 2007/0136792 | A1 * | 6/2007 | Ting et al. ....................... 726/5 |
| 2008/0181239 | A1 * | 7/2008 | Wood et al. .................. 370/401 |

* cited by examiner

*Primary Examiner*—Shin-Hon Chen

(57) ABSTRACT

To authenticate a user of a communications network, credentials from the user are centrally receiving. An authentication sequence is retrieved from a plurality of retrievable authentication sequences, and the retrieved authentication sequence is performed to authenticate the user based on the received credentials.

19 Claims, 9 Drawing Sheets

| SECONDARY AUTHENTICATION SEQUENCE | | | | | | |
|---|---|---|---|---|---|---|
| 450 | 455 | 460 | 465 | 470 | 475 | |
| ID1 | ID2 | ID4 | ID6 | ID8 | ID11 | USER ID, ACTIVITY ID, OTHER ENTITY ID |
| ID3 | ID10 | ID7 | | ID9 | | |
| ID5 | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| IDU | IDV | IDW | IDX | IDY | IDZ | |

FLEXIBLE AND ADJUSTABLE AUTHENTICATION IN CYBERSPACE

RELATED APPLICATIONS

This application claims priority on U.S. Provisional Application Ser. No. 60/772,566, filed Feb. 13, 2006, and entitled "FLEXIBLE AND ADJUSTABLE AUTHENTICATION IN CYBERSPACE", the contents of which are incorporated herein in their entirety by reference.

This application is also related to U.S. application Ser. No. 11/652,616, filed Jan. 12, 2007, and entitled "ENHANCED SECURITY FOR USER INSTRUCTIONS".

This application is also related to U.S. application Ser. No. 11/055,987, filed Feb. 14, 2005, and entitled "ARCHITECTURE FOR ASYMMETRIC CRYPTO-KEY STORAGE", U.S. application Ser. No. 11/055,986, filed Feb. 14, 2005, and entitled "TECHNIQUE FOR ASYMMETRIC CRYPTO-KEY GENERATION", U.S. application Ser. No. 11/056,120, filed Feb. 14, 2005, and entitled "MULTIPLE FACTOR PRIVATE PORTION OF AN ASYMMETRIC KEY", U.S. application Ser. No. 11/055,988, filed Feb. 14, 2005, and entitled "AUTHENTICATION PROTOCOL USING A MULTI-FACTOR ASYMMETRIC KEY PAIR", U.S. application Ser. No. 11/056,116, filed Feb. 14, 2005, and entitled "ROAMING UTILIZING AN ASYMMETRIC KEY PAIR", U.S. application Ser. No. 11/056,114, filed Feb. 14, 2005, and entitled "ASYMMETRIC KEY PAIR HAVING A KIOSK MODE", and U.S. application Ser. No. 11/056,115, filed Feb. 14, 2005, and entitled "TECHNIQUE FOR PROVIDING MULTIPLE LEVELS OF SECURITY", the contents of which are incorporated herein in their entirety by reference.

This application is also related to U.S. application Ser. No. 09/739,260, filed Dec. 19, 2000, and entitled "SYSTEM AND METHOD FOR CRYPTO-KEY GENERATION AND USE IN CRYPTOSYSTEM" (now U.S. Pat. No. 6,970,562, issued Nov. 29, 2005), U.S. application Ser. No. 10/849,818, filed May 21, 2004, and entitled "ONE TIME PASSWORD ENTRY TO ACCESS MULTIPLE NETWORK SITES" (now U.S. Pat. No. 7,055,032, issued May 30, 2006), which is a continuation of U.S. application Ser. No. 09/739,114, filed Dec. 19, 2000, (now abandoned) and U.S. application Ser. No. 09/739,260, filed Dec. 19, 2000, U.S. application Ser. No. 09/739,112, filed Dec. 19, 2000, and entitled "HIGH SECURITY CRYPTO SYSTEM" (now U.S. Pat. No. 6,940,980, issued Sep. 6, 2005), U.S. application Ser. No. 09/739,113, filed Dec. 19, 2000, and entitled "SECURE COMMUNICATIONS NETWORK WITH USER CONTROL OF AUTHENTICATED PERSONAL INFORMATION PROVIDED TO NETWORK ENTITIES" (now U.S. Pat. No. 7,017,041, issued Mar. 21, 2006), U.S. application Ser. No. 09/739,119, filed Dec. 19, 2000, and entitled "METHOD AND SYSTEM FOR AUTHORIZING GENERATION OF ASYMMETRIC CRYPTO KEYS" (now U.S. Pat. No. 7,149,310, issued Dec. 12, 2006), U.S. application Ser. No. 09/739,118, filed Dec. 19, 2000, and entitled "SYSTEM AND METHOD FOR AUTHENTICATION IN A CRYPTO SYSTEM UTILIZING SYMMETRIC AND ASYMMETRIC CRYPTO KEYS" (now U.S. Pat. No. 7,069,435, issued Jun. 27, 2006), and U.S. application Ser. No. 09/739,111, filed Dec. 19, 2000, and entitled "SYSTEM AND METHOD FOR GENERATION AND USE OF ASYMMETRIC CRYPTO KEYS EACH HAVING A PUBLIC PORTION AND MULTIPLE PRIVATE PORTIONS" (now U.S. Pat. No. 7,065,642, issued Jun. 20, 2006), the contents of which are incorporated herein in their entirety by reference.

TECHNICAL FIELD

This invention relates generally to cryptography. More particularly, the present invention relates to the enhanced cryptographic security using authentication.

BACKGROUND

In the early days of computerized systems, authentication of a user to a computer was a relatively simple task. The user typically presented a user identifier, often called a user id, and a secret password. The computer verified the password as being the correct password for that user id. On successful verification the user was allowed access to the computer, usually for a sustained period of time. If the password did not verify correctly access was denied. The simple technique worked reasonably well in the days of time-shared computer systems, where a single computer was used by multiple users accessing it from dumb terminals.

Over time computers were networked together and users became connected to this network from personal computers (PCs) rather than dumb terminals. This led to a new paradigm of computing called client-server where a user on a client computer accesses services and resources from a server computer. Most commonly today the user on the client computer uses a web browser to interact with a web server on a server computer, although other applications such as email and custom applications can also be used. For simplicity we will use the web browser as the example client application in this paper, although the discussion applies to other applications also. A server computer provides services to multiple clients and a client is often receiving services from multiple servers.

Problems with continued use of the "user id plus password method" of authentication were quickly evident in this new environment. As the network grew to become the global Internet with many millions of users, it was believed by many influential researchers and vendors that the correct and scalable solution to authentication would be grounded in the now-familiar technology of public-key cryptography. The early hope for a very simple and widely accepted digital credential to replace user id's and passwords has not come to fruition for a number of reasons. Most users still authenticate to a web site by means of a user id and password, and have to authenticate to each web site they visit often using different user id's and passwords at each site. Since the year 2003 so-called phishing and pharming attacks that capture user id's and passwords have flourished. These attacks mislead a user into believing that the user id and password is being entered into a legitimate web site while it is actually into a rogue web site that captures this information for later use to access the legitimate web site.

A more sophisticated attack called man-in-the-middle (MITM) has also appeared. In a MITM attack, the attacker interposes himself or herself in the channel between the client's web browser and the web server, so the channel can be hijacked later for misuse by the attacker, or individual transactions modified by the attacker as they occur. MITM attacks are particularly effective against one-time passwords (OTPs) which are typically generated by a small hardware token carried by the user which produces a new password periodically (say once every minute) or produces a password in response to a challenge keyed in to the token by the user as communicated by the web server. The use of end-to-end cryptographic mutual authentication such as achieved by client-side (also known as 2-way) SSL is one way to thwart MITM attacks.

As noted above, the earlier desire for a single method of authentication for all users has not materialized. Stronger forms of authentication incur additional costs and inconveniences, while weaker forms of authentication are too risky for users authorized for more sensitive tasks or transactions of higher value. The TriCipher Armored Credential System (TACS) supports different kinds of authentication for different users from a single hardened and scalable authentication server. The TriCipher authentication ladder starts with user id's and passwords at the lowest rung, progressing through browser two-factor solutions which use an encrypted cookie or browser certificate as the second factor in addition to a password, to use of 2-way SSL using a password and variety of additional factors at the user's PC embodied as cryptographic keys stored on the PC's hard disk or on portable media or on smartcards to constitute one private key with a second private key stored and used on the authentication server. Distinguished entities, which are sometime referred to as managers, on the TACS are authorized to configure the kind of authentication required for each user.

In addition to multiple strengths of authentication, enterprises are looking for additional forms of secondary authentication. After the primary authentication occurs it is desired to secondarily authenticate some users, possibly only in some circumstances. This may be in order to compensate for a lower strength of authentication or to protect against attacks by malicious software on the user's PC or other network device.

It is therefore desirable to provide for authentication in a flexible manner.

OBJECTIVES OF INVENTION

It is an object of the present invention to provide an improved technique for supporting authentication.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY OF INVENTION

In accordance with the invention, a user of a communications network is authenticated by centrally receiving credentials from the user. For example, the credentials could be received by a communications interface of a network server, which might represent an authenticating entity, e.g. a bank or merchant, which performs its own authentication or what we sometimes refer to as an authenticating gateway that performs authentication in support of multiple other authenticating entities.

Multiple retrievable authentication sequences are available for authentication based on different types of credentials. For example, one of the sequences could be for authentication based on a one-time password, another of the sequences could be for authentication based on a special code sent to a user's mobile phone, still another of the sequences could be for authentication based on some type of personal user information, e.g. a mother's maiden name. It should be understood that there is no limit on the number of retrievable authentication sequences and that authentication using each such sequence could be based on virtually any type of information likely to be known only to the user.

To authenticate the user, one authentication sequence is retrieved, e.g. by the processor of a network server, from the plurality of retrievable authentication sequences. It will be recognized that the plurality of sequences could be stored at the server, at a network station at which the server is located or elsewhere, so long as they are retrievable by the applicable processor. The retrieved authentication sequence is performed, e.g. by the processor referred to above, to authenticate the user based on the received credentials.

In accordance with certain preferred aspects of the invention, a user of a communications network is authenticated by centrally receiving primary credentials and secondary credentials from the user as part of an initial login protocol. For example, the credentials could be received by a communications interface of a network server, which might represent an authenticating entity, e.g. a bank or merchant, that performs its own authentication or what we sometimes refer to as an authenticating gateway that performs authentication in support of multiple other authenticating entities.

A primary authentication sequence is performed, e.g. by a processor of such a network server, to initially authenticate the user based on the received primary credentials as part of the initial login protocol. Preferably, the user is associated with an asymmetric crypto-key, including a private key and a public key, with the private key having a first private key portion and a second private key portion, and with the first private key portion constructed from at least one of a factor corresponding to the user's password and one or more other factors. If so, beneficially, the primary credentials include the first private key portion, and the first private key portion is received as a signature on a partially signed message. The performance of the primary authentication sequence includes applying the second private key portion to complete the signature on the received partially signed message, and the user is initially authenticated based on the received primary credentials only if completion of the signature results in recovery of the message.

Multiple retrievable secondary authentication sequences are available for secondary authentication based on different types of secondary credentials. For example, one of the sequences could be for secondary authentication based on a one-time password, another of the sequences could be for secondary authentication based on a special code sent to a user's mobile phone, still another of the sequences could be for secondary authentication based on some type of personal user information. It should be understood that there is no limit on the number of retrievable second authentication sequences and that secondary authentication using each such sequence could be based on virtually any type of information likely to be known only to the user.

To secondarily authenticate the user, one secondary authentication sequence is retrieved, e.g. by a server processor, from the plurality of retrievable secondary authentication sequences. It will be recognized that the plurality of sequences could be stored on the server, at a network station at which the server is located or elsewhere, so long as they are retrievable by the server processor. The retrieved secondary authentication sequence is performed, e.g. by the processor referred to above, to secondarily authenticate the user based on the received secondary credentials as part of the initial login protocol. Preferably, the received secondary credentials, for purposes of the login protocol, will include a one-time password, and the performance of the secondary authentication sequence will include validating the received one-time password to secondarily authenticate the user. However, it should be understood that this is not mandatory and other types of secondary credentials could be used for the login protocol.

Optionally, e.g. if an authenticating gateway will perform the authentication in support of multiple authenticating entities, a designation of one of the plurality of retrievable secondary authentication sequences may be received by the authenticating gateway from the applicable authenticating entity, e.g. a particular bank whose records the user wishes to access, and, if so, the retrieved secondary authentication sequence will be the designated secondary authentication sequence.

According to another optional aspect of the invention, verifying secondary credentials information may be received from an authenticating entity. For example, an authenticating gateway server might receive such information from an authenticating entity server, such as a bank or merchant server. In such a case, the secondary authentication sequence can be performed to authenticate the user based also on the received verifying secondary credentials information.

There is of course the possibility that, after initially authenticating the user based on the received primary credentials, secondary authentication of the user based on the received first secondary credentials be unsuccessful, i.e. there may be a failure to secondarily authenticate the user based on the received first secondary credentials. In such a case, there are various options for proceeding with authentication.

One option is to transmit, e.g. from the applicable network server, a request for secondary credentials. For example, the processor of the applicable network server might direct transmission of such a request by the server's communication interface. In such a case the authenticating entity again receives secondary credentials in response to the transmitted request, and again performs the same secondary authentication sequence to secondarily authenticate the user based on the again received secondary credentials. As will be recognized, the later received secondary credentials might be received via the communication interface of the applicable server, and the server processor may again perform the secondary sequence based on the later received secondary credentials.

Another option is to transmit a request for different secondary credentials, if the primary authentication sequence is performed successfully but the secondary first authentication sequence is not successfully performed, i.e. fails to secondarily authenticate the user. For example, the processor of the applicable network server might direct transmission of such a request via the server communication interface. Different type secondary credentials are centrally received, e.g. by the communications interface of the applicable server, in response to the transmitted request, and a second secondary authentication sequence is performed, e.g. by the applicable server processor, to secondarily authenticate the user based on the received different type secondary credentials. Here again, if authentication is being performed by authenticating gateway, verifying secondary credentials information may be centrally received, e.g. via the gateway server communication interface, from an entity other than the user, e.g. an authenticating entity such as a bank or merchant. In such a case, the user is secondarily authenticated by performance of the different type secondary authentication sequence based also on the received verifying secondary credentials information. If first and second secondary authentication sequences are utilized, the first received secondary credentials might be a one-time password, while the second received secondary credentials would be something other than a one-time password. If so, the first secondary authentication sequence would verify the one-time password to secondarily authenticate the user for purposes of initial login, and the second secondary authentication sequence would verify something other than a one-time password to secondarily authenticate the user for purposes of initial login.

In an exemplary practical implementation, a user network device, which could be any type of device capable of communicating over the applicable network, including a personal computer (PC), mobile telephone, or personal digital assistant (PDA), is configured to transmit, as part of an initial login protocol, a first message including primary credentials of the user and a second message including secondary credentials of the user. The first and second messages could, if desired, be communicated as a single combined message. An authenticating entity network station, which may represent an authenticating entity or an authenticating gateway which performs authentication for multiple authenticating entities, is configured, e.g. programmed with the necessary instructions, to perform, as part of the initial login protocol, a primary authentication sequence to initially authenticate the user based on the transmitted primary credentials. The authenticating entity network station is also configured to store a plurality of secondary authentication sequences, retrieve one of the stored plurality of secondary authentication sequences, and perform, as part of the initial login protocol, the retrieved secondary authentication sequence to secondarily authenticate the user based on the transmitted secondary credentials.

As noted above, preferably the user is associated with an asymmetric crypto-key, including a private key and a public key, with the private key having a first private key portion and a second private key portion, and with the first private key portion constructed from at least one of a factor corresponding to the user's password and one or more other factors. If so, the primary credentials could be the first private key portion and the transmitted first message could be partially signed with the first private key portion. In such a case, the performance of the primary authentication sequences will beneficially include applying the second private key portion to complete the signature on the transmitted partially signed first message.

As also discussed above, optionally, e.g. if the authenticating entity network station represents an authenticating gateway, another network entity station, e.g. representing an authenticating entity, is configured to transmit a designation of one of the stored plurality of secondary authentication sequences. If this option is included, the authenticating entity network station is further configured to retrieve the one secondary authentication sequence from the stored plurality of secondary authentication sequence based on the transmitted designation.

If, for example, the transmitted secondary credentials include a one-time password, the performance of the secondary authentication sequence will include validating the transmitted one-time password to secondarily authenticate the user. Furthermore, another entity network station, which could represent another authenticating entity if the authenticating entity network station represents an authenticating gateway, may additionally or alternatively be configured to transmit verifying secondary credentials information. In such a case, the secondary authentication sequence is performed by the authenticating entity network station to secondarily authenticate the user based also on the transmitted verifying secondary credentials information.

The authenticating entity network station may be optionally further configured to transmit a request for secondary credentials after initially authenticating the user based on the transmitted primary credentials but failing to secondarily authenticate the user based on the transmitted secondary credentials, which can under this option be considered first secondary credentials. If so, the user network device is further configured to transmit second secondary credentials in response to the transmitted request, and the authenticating entity network station is also further configured to again perform the secondary authentication sequence to secondarily authenticate the user based on the transmitted second secondary credentials. For example, the first and second secondary credentials might be different one-time passwords.

Alternatively, the authenticating entity network station may optionally be further configured to retrieve another or second of the stored plurality of secondary authentication sequences, and perform the retrieved second secondary authentication sequence to secondarily authenticate the user based on the transmitted second secondary credentials. For example, in this alternative implementation the first secondary credentials might be a one-time password, while the second secondary credentials could be a special code, personal user information such as the maiden name of the user's mother, other some other information known only to the user other than a one-time password. If both first and second secondary authentication sequences are used, another entity network station may be configured to transmit verifying secondary credentials information for one or both of the first and second secondary credentials. If so, the first and/or second secondary authentication sequence, as applicable, can advantageously be performed by the authenticating entity network station to secondarily authenticate the user based also on the received verifying secondary credentials information.

In accordance with other preferred aspect of the invention, to authenticate a user of a communications network primary credentials and first secondary credentials are received, e.g. by a communications interface of a network server, from the user via the network as part of an initial login protocol for a session. As part of the initial session login protocol, both a primary authentication sequence is performed, e.g. by the processor of such a network server, to initially authenticate the user based on the received primary credentials and a first secondary authentication sequence is performed to secondarily authenticate the user based on the received first secondary credentials. The user is authenticated to another entity, e.g. an entity that controls access to information on the network, based on successful completion of the initial and the secondarily authentications. This authenticating to the other entity could be explicit or could be implicit in the redirecting of the user from an authenticating website to the other entity's website.

While not mandatory, the user is preferably associated with an asymmetric crypto-key, including a private key and a public key, with the private key having a first private key portion and a second private key portion, and with the first private key portion constructed from at least one of a factor corresponding to the user's password and one or more other factors. If so, the primary credentials can be the first private key portion, and this key portion can be received as a signature on a partially signed message. In such a case, the performance of the primary authentication sequence will include applying the second private key portion to complete the signature on the received partially signed message, and the user will be initially authenticated based on the received primary credentials only if completion of the signature results in recovery of the message.

A request to re-authenticate the user is received, e.g. by the communications interface referred to above, via the network from the other entity during the session, i.e. after successful completion of the initial login protocol. This request may be explicit, or could be implicit in the redirecting of the user from the other entity's website to an authenticating website. A request for secondary credentials is transmitted, e.g. by the communications interface, via the network responsive to the receipt of the re-authentication request. In response to the transmitted request for secondary credentials, either the first secondary credentials are again received, e.g. by a communications interface, from the user via the network, or second secondary credentials are received, e.g. by a communications interface, from the user via the network. Next, either the first secondary authentication sequence is again performed, e.g. by the server processor referred to above, to re-authenticate the user based on the again received first second secondary credentials or on the received second secondary credentials, or a second secondary authentication sequence is performed, e.g. by the server processor referred to above, to re-authenticate the user based on the received second secondary credentials. The user is re-authenticated to the other entity based on successful completion of the re-authentication. This re-authenticating to the other entity could be explicit or could be implicit in the redirecting of the user from an authenticating website to the other entity's website.

Optionally, a designation of one of a plurality of retrievable secondary authentication sequences may be received from the other entity prior to beginning the initial login protocol. If so, the first secondary authentication sequence is retrieved from the plurality of retrievable secondary authentication sequences based on the received designation. If the second secondary credentials received from the user in response to the transmitted request for secondary credentials are of the same type as the first secondary credentials, e.g. if the first secondary credentials are a first one-time password and the second secondary credentials a different second one-time password, the retrieved first secondary authentication sequence can again be performed to re-authenticate the user based on the received second secondary credentials.

In accordance with another option, verifying first secondary credentials information and verifying second secondary credentials information may be received from the other entity. If so, the first secondary authentication sequence is performed to secondarily authenticate the user based also on the received verifying first secondary credentials information, and the first secondary authentication sequence is performed to re-authenticate the user based also on the received verifying second secondary credentials information.

Furthermore, in addition to optionally receiving the designation of one of the plurality of retrievable secondary authentication sequences from the other entity as discussed above, another or second designation of another of the plurality of retrievable secondary authentication sequences may also optionally be received from the other entity. The second designation of the other secondary authentication sequence could, like the first designation, be received from the other entity prior to beginning the initial login protocol or could alternatively be received in association with the received request to re-authenticate the user If a second designation is received, the second secondary authentication sequence is also retrieved from the plurality of retrievable secondary authentication sequences based on the received second designation. Receipt of a second designation will also typically mean that the second secondary credentials received from the user in response to the transmitted request for secondary credentials are of a different type than the first secondary credentials. For example, if the first secondary credentials are a one-time password, the second secondary credentials would be other than a one-time password, such as a mobile phone or personal computer (PC) code. The retrieved second secondary authentication sequence is performed to re-authenticate the user based on the received second secondary credentials.

According to another optional aspect of the invention, verifying second secondary credentials information, e.g. a mobile phone or personal computer (PC) code, may be received from the other entity. If so, the second secondary authentication sequence is performed to re-authenticate the user based also on the received verifying second secondary credentials information.

In an exemplary practical implementation, a user station is configured with the necessary hardware and/or logic, to transmit, as part of an initial login protocol for a session, primary credentials and first secondary credentials of the user. The user station could be a personal computer (PC), mobile telephone, personal digital assistant (PDA) or any other type of network capable device. An authenticating station is configured to perform, as part of the initial session login protocol, a primary authentication sequence to initially authenticate the user based on the transmitted primary credentials, and a first secondary authentication sequence to secondarily authenticate the user based on the transmitted first secondary credentials. The authenticating station is also configured to transmit an authentication message based on successful completion of the initial and the secondarily authentications. As noted above this message may be implicit in the redirecting of the user station from the authenticating station to an information server station.

The information server station is configure to allow access to information during the session based on the transmitted authentication message. It is also configured to transmit, during the session, a request to re-authenticate the user. For example, the request to re-authenticate the user may be transmitted by the information server station based on the user station transmitting a user request to access particular information, take particular action with respect to accessed information, or change particular information during the session. On the other hand, the request to re-authenticate the user might also or alternatively be transmitted by the information server station based on passage of a time period during the session. Here also, as noted above this request may be explicit or implicit in the redirecting of the user station from the information server station back to the authenticating station.

The authenticating station is further configured to transmit, responsive to the transmitted re-authentication request, a request for secondary credentials. The user station is further configured to respond to the transmitted request for secondary credentials by either again transmitting the first secondary credentials or transmitting second secondary credentials of the user. The authenticating station is further configured to either again perform the first secondary authentication sequence to re-authenticate the user based on the again received first secondary credentials or the received second secondary credentials, or perform a second secondary authentication sequence to re-authenticate the user based on the received second secondary credentials. The authenticating station is also further configured to transmit a re-authentication message based on successful completion of the re-authentication. Here again, this message may be implicit in the redirecting of the user station from the authenticating station back to the information server station. The information server station is configured to allow the user to access particular information, to take particular action with respect to accessed information, or to change particular information during the session based on the transmitted re-authentication message.

If, for example, the second secondary credentials are received from the user in response to the transmitted request for secondary credentials, and the second secondary credentials are of the same type as the first secondary credentials, the information server station may optionally be further configured to transmit, prior to the authenticating station beginning the initial login protocol, a designation of one of a plurality of retrievable secondary authentication sequences. The authenticating station can, if desired, be further configured to retrieve the first secondary authentication sequence from the plurality of retrievable secondary authentication sequences based on the transmitted designation. In such case, the retrieved first secondary authentication sequence is performed to secondarily authenticate the user based on the received first secondary credentials and again performed to re-authenticate the user based on the received second secondary credentials.

The information server station may also optionally be further configured to transmit verifying first secondary credentials information and verifying second secondary credentials information. If so, the first secondary authentication sequence may be performed to secondarily authenticate the user based also on the transmitted verifying first secondary credentials information, and the first secondary authentication sequence may be performed to re-authenticate the user based also on the transmitted verifying second secondary credentials information.

If the second secondary credentials are transmitted by the user station in response to the transmitted request for secondary credentials, but the second secondary credentials are of a different type than the first secondary credentials, the information server station may optionally be further configured to transmit, prior to beginning the initial login protocol, a first designation of one of a plurality of retrievable secondary authentication sequences and to also transmit a second designation of another of the plurality of retrievable secondary authentication sequences. As noted above, the second designation of the other secondary authentication sequence may be transmitted prior to beginning the initial login protocol or in association with the transmitted request to re-authenticate the user, or even at some other time prior to re-authentication. In cases where the second designation is transmitted, the authenticating station can be further configured to retrieve the first secondary authentication sequence from a plurality of retrievable secondary authentication sequences based on the transmitted first designation, and retrieve the second secondary authentication sequence from the plurality of retrievable secondary authentication sequences based on the transmitted second designation. If so, the retrieved first secondary authentication sequence can be performed to secondarily authenticate the user based on the received first secondary credentials and the retrieved second secondary authentication sequence can be performed to re-authenticate the user based on the received second secondary credentials.

The information server station may optionally be further configured to transmit verifying second secondary credentials information. In such a case, the second secondary authentication sequence can be performed such that the user is re-authenticated based also on the received verifying second secondary credentials information.

BRIEF DESCRIPTION OF DRAWING

FIG. 5 depicts a look-up table suitable for use in storing the rules in the data store 350, in accordance with the present invention.

ENABLING DESCRIPTION OF THE PREFERRED EMBODIMENT(S)

Overview

Figure 1:
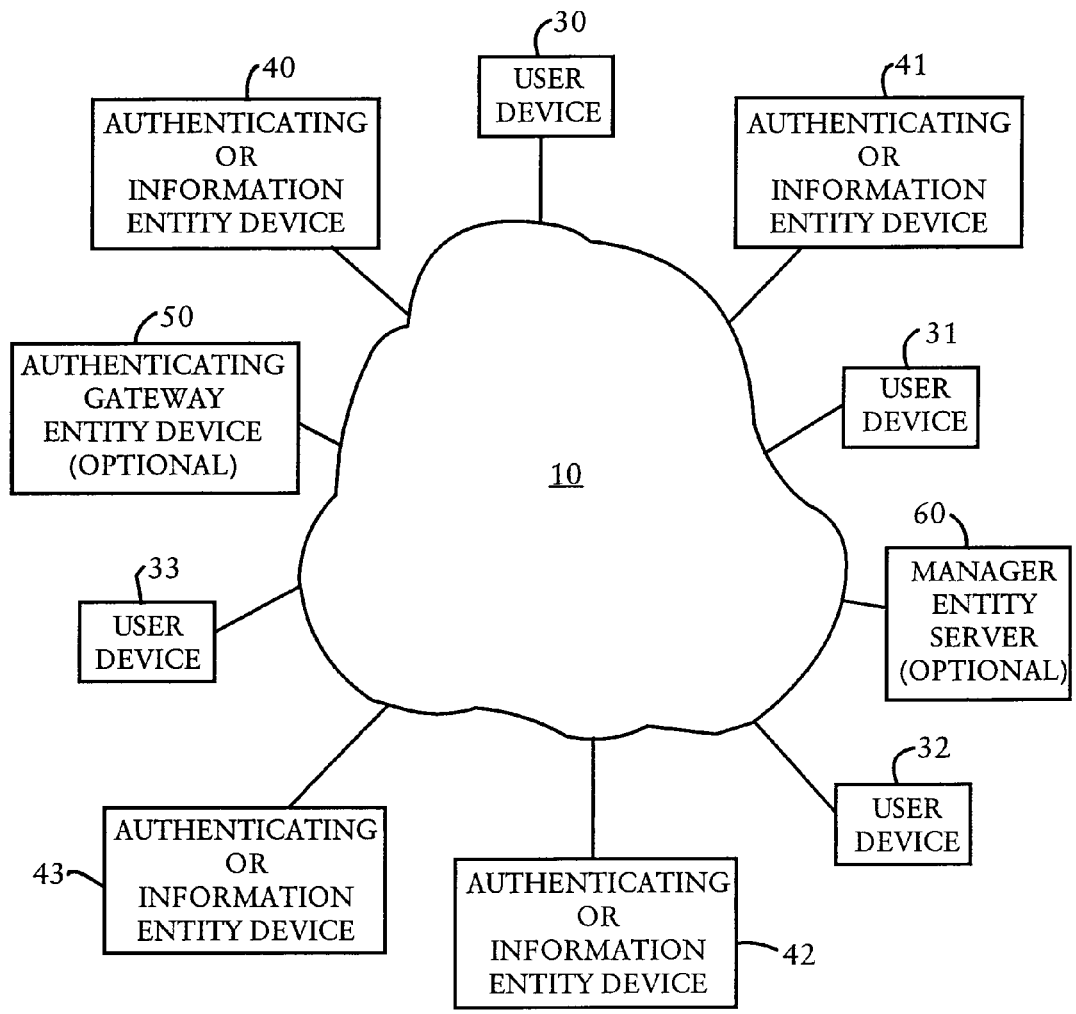
FIG. 1 depicts an exemplary network, including networked devices associated with users, a sponsor, merchants, and optional distinguished entities, in accordance with the present invention.

The invention provides a technique for enhanced authentication of a user of a communications network using secondary authentication. Two distinct ways in which secondary authentication can be beneficially deployed are described below.

Before proceeding with the description, it should be noted that there are two kinds of users who can have accounts on the authenticating entity. Consumers are users who are allowed to authenticate and then access and possibly modify information regarding their own account. Managers are users who are able to authenticate and then access and modify properties of not only their own account but also accounts of other users, who could be consumers or managers. As used herein, the term "user" refers to both consumers and managers, unless otherwise indicated.

One of the ways in which secondary authentication can be beneficially deployed is authentication-server centric. An authentication server, such as a merchant or bank server, which could also be an information server or could be co-located at a network station or otherwise associated with an information server, such as a merchant or bank server, will provide a number of protocols by which it can be asked to authenticate a user for the first time to establish a new authenticated session (called a login session) or to re-authenticate a previously authenticated user during an existing login session. Examples of these protocols include the initial login, which will preferably include both a primary authentication sequence and secondary authentication sequence, to establish a new authenticated session, as well as a login after reset of a user's account or after a change of a user's password, which will preferably include only a secondary authentication sequence, to re-authenticate a previously authenticated user during an existing login session. Another example of a re-authentication protocol familiar to users of Internet services is the requirement to re-enter the password when doing a sensitive task such as change of address. Likewise, transfer of a large sum of money may trigger the request to enter a code value communicated to a user's mobile telephone for purposes of re-authentication. For each user the authentication server may require different forms of authentication and/or re-authentication.

The authentication server in this implementation is not necessarily locked into a specific set of forms of authentication, e.g. a specific set of secondary authentication sequences. Moreover, it may be desirable for different users to be subject to different forms and degrees of authentication. Thus, the authentication server preferably has the flexibility to handle whatever forms or degrees of authentication as may be desired for different users.

The second way in which secondary authentication can be beneficially deployed is application-centric, where the authentication is invoked by an authentication server, which is often referred to as a gateway server, at the request of an application operating on an information server, such as a merchant or bank server. In this case the application executing on the information server is aware of the circumstances under which secondary authentication by an authenticating gateway should be requested, and may apply different rules for different users.

The Network Architecture

FIG. 1 illustrates a network 10, which could be the Internet or another public or private network. As shown, the network 10 includes multiple network devices interconnected so as to be capable of communicating with each other. These network devices include network devices 30-33 associated with respective individual users, network devices 40-43 associated with authenticating and/or information entities, which could be any type entity having a presence, e.g. a web page, on network 10, such as merchants or banks, an optional network device 50 associated with a authenticating gateway entity known to and trusted by the authenticating entities, and an optional network device 60 associated with a manager entity, such as a sponsor or distinguished entity, also known to and trusted by the authenticating entities.

User network devices 30-33 are typically personal computers, but could be other types of network devices. Authenticating/information entity network devices 40-44 typically take the form of network servers. Accordingly, the authenticating/information entity network devices 40-44 will sometimes be referred to as authentication or information servers. The gateway entity network device 50 also typically takes the form of a network server, and will sometimes be referred to as an authentication gateway server. The manager network device 60 also typically takes the form of a network server, and will sometimes be referred to as a manager server. If included, the manager network device 60 will function to select secondary authentication sequences based on the applicable criteria and communicate the identity of the selected sequences to the applicable authentication server 40-43 or 50, as appropriate. It will be understood that the network 10 may, and typically will, consist of more network devices than depicted in FIG. 1.

The User Network Device

Figure 2:
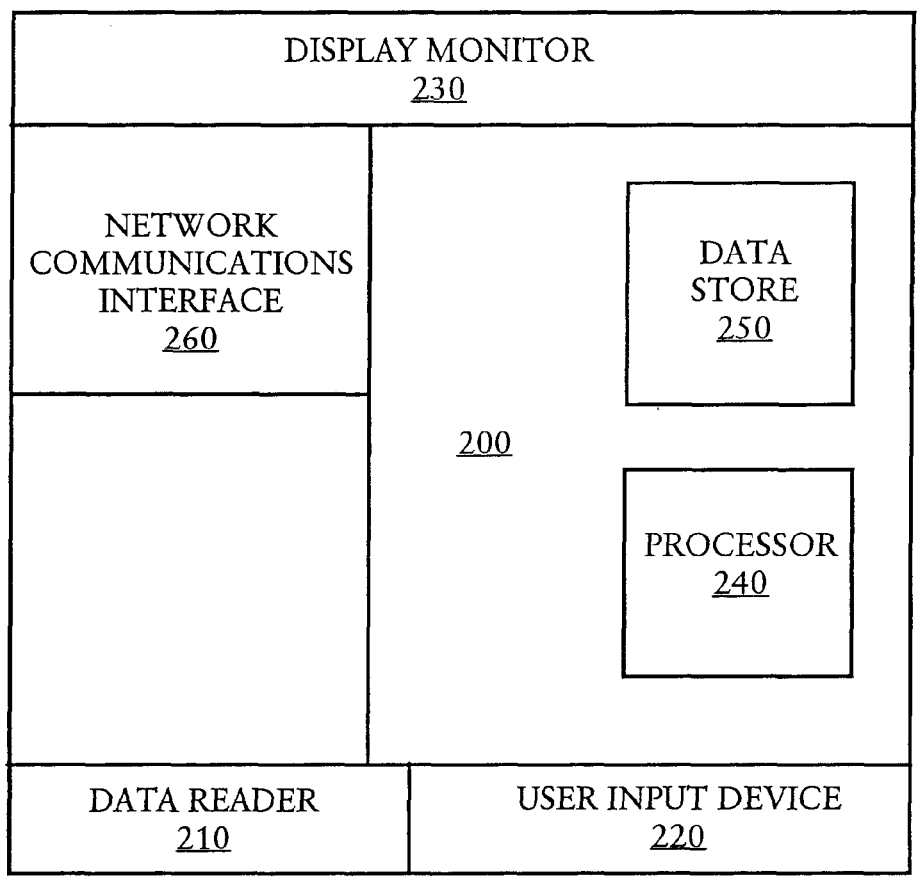
FIG. 2 depicts an exemplary block diagram of components of a computer suitable for use by a user to access a network, in accordance with the invention.

FIG. 2 depicts a simplified block diagram of an exemplary personal computer (PC) 200 suitable for use by an individual user as a user network device 30-33 to access the network 10. The PC is preferably a commercially available personal computer. It will be recognized that the PC configuration is exemplary, and that other components (not shown) could be added to or substituted for those depicted and certain of the depicted components could be eliminated if so desired. Further, each user device 30-33 could be another type device, i.e. a device other than a PC, such as, but not limited to, a personal digital assistant (PDA) or a mobile phone, e.g. cellular phone, or other type wireless communications device.

The PC or other type user network device functions in accordance with stored programmed instructions, which are sometimes characterized as logic, that are executed to drive its operation. Preferably, the computer stores its programmed instructions in an internal data store, which could for example be an erasable programmable read only memory (EPROM), and/or hard disk. It will be recognized that only routine programming is required to implement the instructions required to drive the user network device to operate in accordance with the invention. Further, routine operations performed by depicted components will generally not be described, such operations being well understood in the art.

Referring to FIG. 2, the computer 200 includes a data reader 210 for loading programming or data from a floppy disk, compact disk (CD), or other removable media, onto the computer 200. The computer 200 also includes a user input device 220, such as a keyboard and/or mouse. A display monitor 230 is also provided to visually communicate, i.e. display, information to the user. The computer 200 has a main processor 240 that is interconnected via bus (not shown) with various remote and/or local data stores, which are depicted collectively as data store 250.

Data store 250 may include, but is not limited to, an EPROM, read only memory (ROM), random access memory (RAM), a hard drive with an associated hard disk, CD drive with an associated CD, a floppy drive with an associated floppy disk, a universal serial bus (USB) port for connecting a USB drive (often called a flash drive or memory), and/or a smart card reader for communicating with a smart card. The data store 250 might also include a trusted processing module (TPM) for securely storing cryptographic keys.

As also shown, the computer 200 includes a network communications interface 260, for sending and receiving communication signals, commonly referred to as messages, over the network 10. The network communications interface 260 will typically include an I/O port and might also include a telephone or cable modem. By accessing and executing the computer programming instructions, i.e. the logic, stored at the data store 250, the processor 240 is driven to operate in accordance with the present invention.

The Authenticating Entity or Authenticating Gateway Entity Network Device

Figure 3:
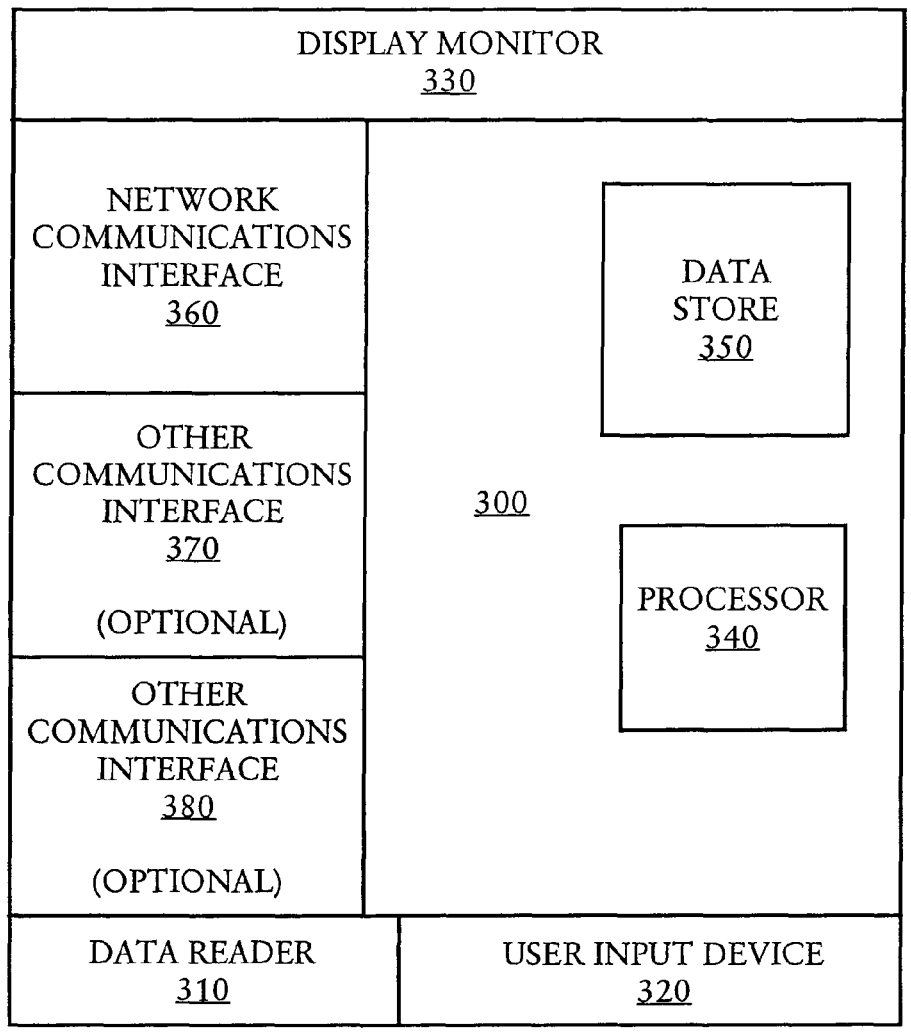
FIG. 3 depicts an exemplary block diagram of components of a server suitable for use by an authenticating or authenticating gateway entity, in accordance with the present invention.

FIG. 3 depicts a simplified block diagram of an exemplary network server 300 suitable for use by an authenticating/information entity or authenticating gateway entity as an authenticating/information entity or authenticating gateway entity device 40-43 or 50 to access the network 10. The server is preferably a commercially available personal or higher power computer. It will be recognized that the server configuration is exemplary, and that other components (not shown) could be added or substituted for those depicted and certain of the depicted components could be eliminated if so desired.

The server functions in accordance with stored programmed instructions, i.e. logic, that are executed to drive its operation. Preferably, the computer stores its programmed instructions in an internal data store, which could for example be an erasable programmable read only memory (EPROM), and/or hard disk. It will be recognized that only routine programming is required to implement the instructions required to drive the authenticating/information entity or authenticating gateway entity device to operate in accordance with the invention. Further, routine operations performed by depicted components will generally not be described, such operations being well understood in the art.

Referring to FIG. 3, the computer 300 includes a data reader 310 for loading programming or data from a floppy disk, compact disk (CD), or other removable media, onto the computer 300. The computer 300 also includes an operator input device 320, such as a keyboard and/or mouse. A display monitor 330 is also provided to visually communicate, i.e. display, information to the operator. The computer 300 has a main processor 340 that is interconnected via bus (not shown) with various remote and/or local data stores, which are depicted collectively as data store 350.

Data store 350 may include, but is not limited to, an EPROM, read only memory (ROM), random access memory (RAM), a hard drive with an associated hard disk, CD drive with an associated CD, a floppy drive with an associated floppy disk, a universal serial bus (USB) port for connecting a USB drive (often called a flash drive or memory), and/or a smart card reader for communicating with a smart card. The data store 350 might also include a trusted processing module (TPM) for securely storing cryptographic keys.

As also shown, the computer 300 includes a network communications interface 360, for sending and receiving communication signals, commonly referred to as messages, over the network 10. The network communications interface 360 will typically include an I/O port and might also include a telephone, cable, satellite or other type of modem.

The computer 300 may optionally include a communications interface 370, for sending and receiving communication signals to and from an external authenticating entity (not shown) over a communications link outside the network 10. For example, it will be recognized that the applicable authenticating server could, if desired, work with external authenticating entity server (also not shown) to perform authentication in accordance with the present invention. If so, the external authenticating entity may be collocated with the authenticating device, and the communications link might be via a cable connected to the communications interface 370. Alternatively, the external authenticating entity may not be collocated with the computer, and the communications link might be via a separate network, such as the public switch telephone network, to which the communications interface 370 can be interconnected. The network communications interface 370 will typically include an I/O port and might also include a telephone or cable modem.

The computer 300 may optionally include a communications interface 380, for sending and receiving communication signals to and from a manager entity, represented by manager network device 60, over a communications link outside the network 10. For example, if the manager entity device 60 is collocated with the applicable authenticating entity device, the communications link might be via a cable connected to the communications interface 380. If the manager entity device 60 is not collocated with the applicable authenticating entity device, the communications link might be via a separate network, such as the public switch telephone network to which the communications interface 380 can be interconnected. The network communications interface 380 will typically include an I/O port and might also include a telephone, cable or satellite modem.

By accessing and executing the computer programming instructions, i.e. the logic, stored at the data store 350, the processor 340 is driven to operate in accordance with the present invention.

Storage of the Logic and Data on the Authentication Servers or Authentication Gateway Server As noted above, performance of the initial login protocol preferably requires initial primary authentication of the applicable user using a primary authentication sequence, based on the user's primary credentials, and further secondary authentication of that user using a secondary authentication sequence, based on the user's secondary credentials for the applicable secondary authentication sequence. Performance of the re-authentication protocol requires re-authentication of the applicable user using either the same or a different secondary authentication sequence, based on the user's secondary credentials for the applicable secondary authentication sequence. If the same secondary authentication sequence is used in both the initial login protocol and the re-authentication protocol, re-authentication may be based on secondary credentials of the user that are either the same or different from those on which the secondary authentication in the initial login protocol was based.

Thus, each entity that will be relied upon for authentication, i.e. each of the authentication servers 40-43 or the authentication gateway server 50, must have access to the cryptographic logic for performing an initial login protocol to establish a particular communications session, as well as a re-authentication protocol to continue the session or to take certain action after initially logging in for the session, i.e. after successful completion of the initial login protocol. Accordingly, each of the authentication servers 40-43 or the authentication gateway server 50, as applicable, has stored in the data store 350 of a computer 300 at least one primary authentication sequence and preferably multiple different secondary authentication sequences.

Figure 4:
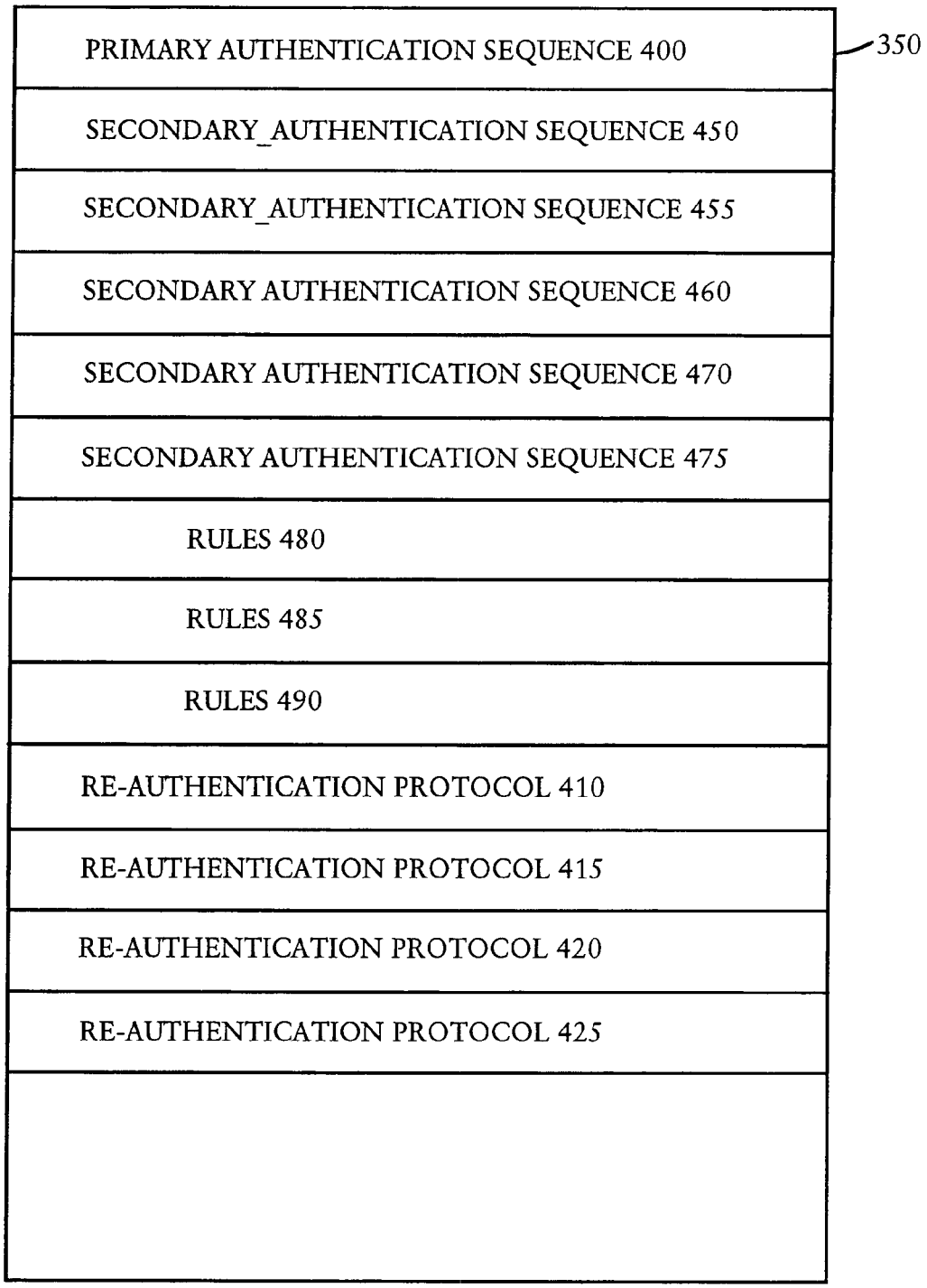
FIG. 4 depicts the data store 350 of FIG. 3 with multiple authentication sequences and rules for applying those sequences stored therein, in accordance with the present invention.

As shown in FIG. 4, the data store 350 of computer 300 stores a primary authentication sequence, which in this implementation we refer to as the primary authentication sequence 400. Preferably, a split key asymmetric authentication sequence of the type described in the specifications of the applications identified in the Related applications section of this specification is used as the primary authentication sequence 400. Tricipher™ Armored Credential (TAC) split key asymmetric authentication cryptography offers such a sequence. However, another authentication sequence, such as another type asymmetric authentication sequence or a symmetric key authentication sequence, could alternatively be used as primary authentication sequence 400 if so desired. As noted above, the data store 350 could additionally store one or more other primary authentication sequences, such as one or more other type asymmetric primary authentication sequences and/or one or more symmetric key primary authentication sequences, if so desired.

As also depicted in FIG. 4, the data store 350 of computer 300 also stores multiple different secondary authentication sequences 450-475, although it will be recognized that only a single secondary authentication sequence could be stored if so desired. As shown, the stored secondary authentication sequences include (i) a one-time-password (OTP) based secondary authentication sequence 450, (ii) a knowledge-based secondary authentication sequence 455, e.g. a sequence which requires that the user answer a number of questions based on personal and private information which presumably an attacker will not know, (iii) a communication based secondary authentication sequence 460, e.g. a sequence which requires that the user provide a code sent to the user's mobile telephone, (iv) a location based secondary authentication sequence 465, e.g. a sequence which requires information on the internet protocol (IP) address or other location-identifying mechanism, (v) a device security based secondary authentication sequence 470, e.g. a sequence which requires information that the user's PC is free of malicious software, such as evidence of deployment and use of security software on the PC, and (vi) a usage pattern based secondary authentication sequence 475, e.g. a sequence which examines the pattern of usage to detect fraudulent activity, such as authentication taking place at unusual times or with unusual frequency for a particular user.

It will be recognized that this is not an exhaustive list and other forms of secondary authentication could be stored in the data store 350, including secondary authentication sequences that may emerge in future. Thus, each of the authentication servers 40-43 or the authentication gateway server 50 is not locked into a specific set of forms of secondary authentication, i.e. a specific set of secondary authentication sequences. Furthermore, it should be understood that it may be desirable for different users to be subject to different forms and degrees of secondary authentication. Thus, each authentication server 40-43 or the authentication gateway server 50, as applicable, preferably has the flexibility to handle whatever forms or degrees of secondary authentication may be desired for different users.

As also depicted in FIG. 4, each of the authentication servers 40-43 or the authentication gateway server 50 may, depending on the implementation, additionally has stored in the data store 350, rules relating to which of the secondary authentication sequences 450-475 is to be used in performing the initial login protocol and/or the re-authentication protocol based on one or more particular factors. As shown, the data store 350 stores (a) identity based rules 480, which require that a particular one of the secondary authentication sequences 450-475 be selected based on the identify of the applicable user, (b) activity based rules 485, which require that a particular one of the secondary authentication sequences 450-475 be selected based on the particular activity the user desires to perform, and (c) non-user entity based rules 490, which require that a particular one of the secondary authentication sequences 450-475 be selected based on the identify of a particular non-user entity, e.g. the identify of an information entity or a sponsor/distinguished entity which is associated with the user or with a request to authenticate the user.

As also depicted in FIG. 4, each of the authentication servers 40-43 may, depending on the implementation, additionally has stored in the data store 350, protocols that require re-authentication of a user during the logged-in session before the requested action will be carried out. Examples of such protocols include (i) a password change protocol 410, which requires re-authentication responsive to the user's request to change the password, (ii) a retrieve information protocol 415, which requires re-authentication responsive to the user's request to retrieve information stored in the user's account, such as address and telephone number, (iii) a modify information protocol 420, which requires re-authentication responsive to the user's request to retrieve and modify information stored in the user's account, such as address and telephone number, and (iv) a modify information protocol 425, which requires re-authentication based on the passage of time during a logged-in session. We call protocols 410-425 the re-authentication protocols. These re-authentication protocols will be allowed to run only if there is a valid logged in session.

It should be noted that if a gateway entity performs the authentication, the re-authentication protocols 410-420 will normally reside at each information entity device, such as each of information servers 40-43, and not at the gateway authentication server 50. However, the re-authentication protocol 425 could reside either at each information entity device or at the gateway authentication server 50 as may be desirable under the circumstances.

As shown in FIG. 5, any of the rules 480, 485 or 490 can be implemented in the form of a look-up table 500, in which the predetermined secondary authentication sequences 450-475 are linked, i.e. associated, with some type of identifiers (IDs). In the exemplary implementation being described, the table 500 includes ID1-IDZ 510 representing the factors on which a particular one of the secondary authentication sequences 450-475 is to be selected in accordance with the applicable one of the rules 480, 485 or 490. Thus, if the table 500 is for rules 480, the IDs 510 would be user identifiers. On the other hand, if the table 500 is for rules 485, the IDs 510 would be activity identifiers. If the table 500 is for rules 490, the IDs 510 would be other entity, i.e. non-user entity, identifiers.

Exemplary Implementation of Authentication Server-Centric Flexible Secondary Authentication In this implementation, the networked system does not include the optional gateway server 50. Because multiple different secondary authentication sequences 450-475 are stored at the data store 350 of each authentication server 40-43, each of these servers has available a number of different secondary authentication sequences, any of which it can be requested to select, or it can select based on other than a request, e.g. based on the rules 480, 485 and/or 490, to be used to authenticate a user for the first time, i.e. via the initial login protocol, to establish a new authenticated session, which is sometimes referred to as a new login session, or for a second or later time, i.e. via the re-authenticate protocol, to again authenticate the user during an existing session. For each user and each of the login and re-authentication protocols one or more manager entities, which may be represented on the network by a manager server 60, are authorized to specify a sequence for a required secondary authentication. This sequence is preferably specified, explicitly or by default, when the user account is first created and may be subsequently modified.

As noted above, for each user the authentication server may select different forms of secondary authentication, whether it is desired that the selection be based on the user identity, the activity, the identity of another entity, or some other factor. Thus, the authentication server is sufficiently flexible to handle whatever forms or degrees of secondary authentication may be desired for each user.

Session Login Protocol

Figure 6A:
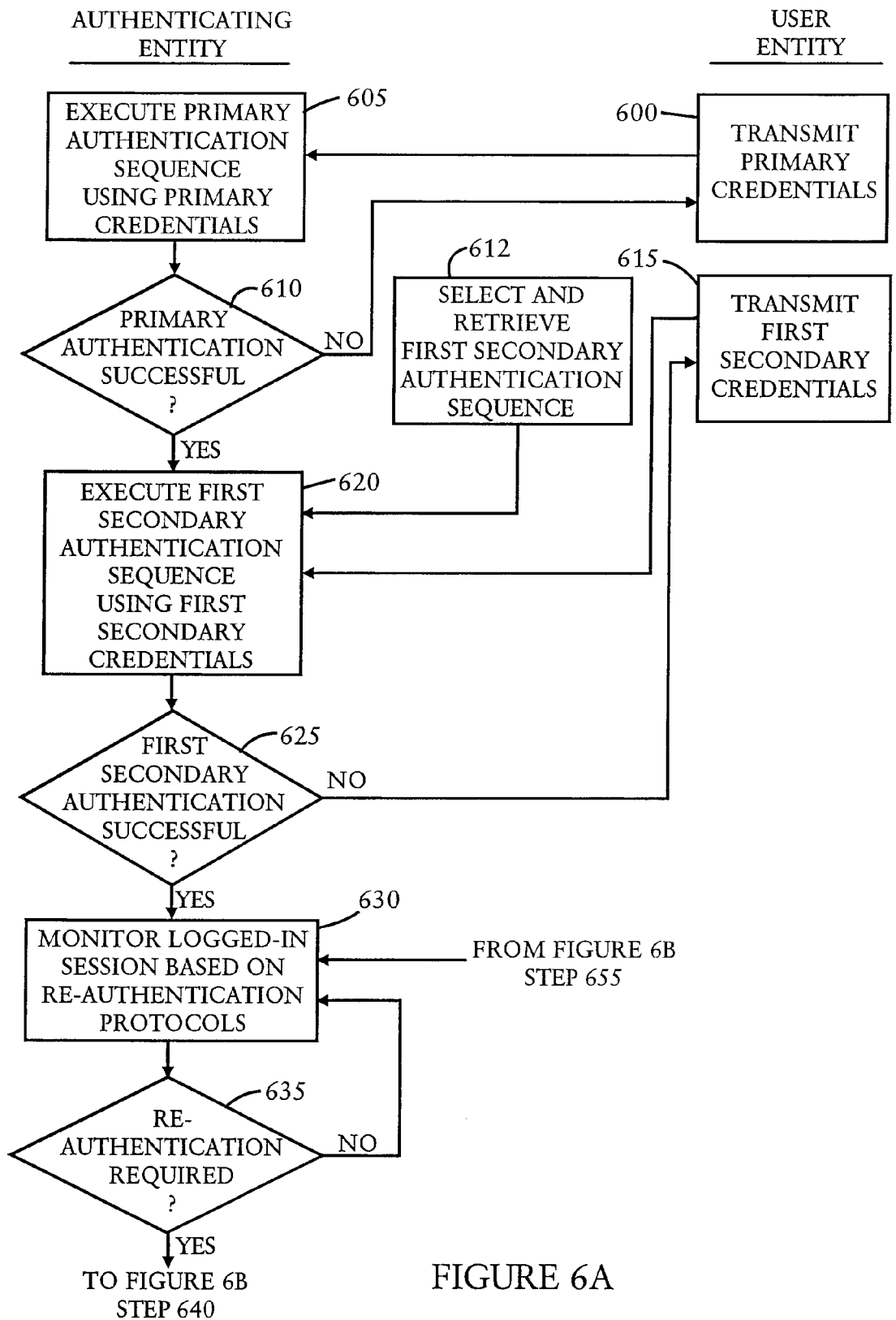
FIGS. 6A-6B depict operations of networked devices shown in FIG. 1, in accordance with one implement the present invention.
Figure 6B:
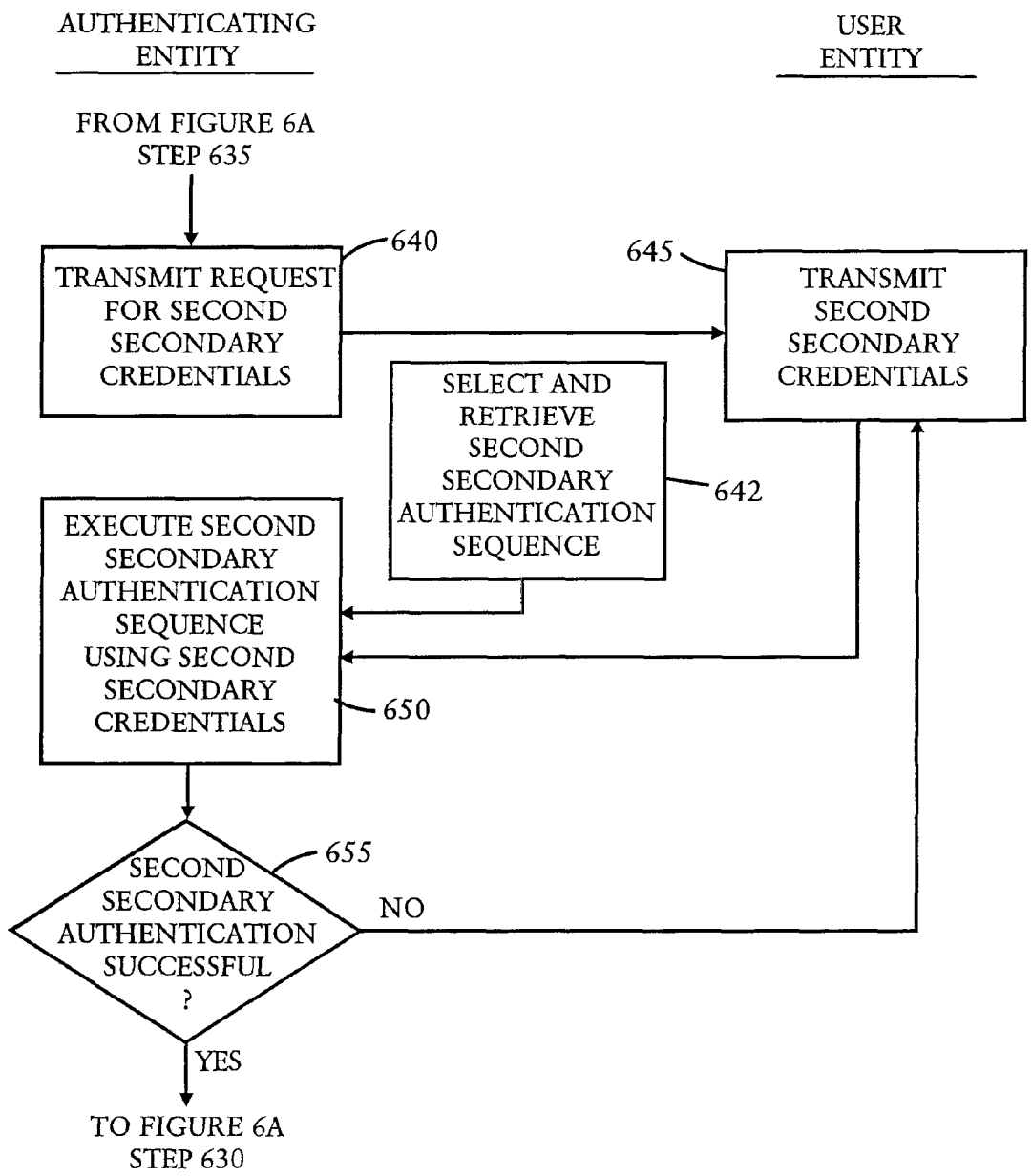

Turning now to FIGS. 6A and 6B, in step 600 an authenticating entity, represented for example by authenticating server 40, receives primary credentials transmitted via the network 10 from the user, represented for example by a user network device 30, such as a personal computer (PC) executing a browser application, as part of an initial login, e.g. the session login protocol. The primary credentials could, for example, be a factor corresponding to the user's password and/or other factors necessary to construct a private or public key of an asymmetric crypto-key, and preferably a split asymmetric crypto-key, associated with the user.

In step 605, the authenticating entity performs a primary authentication sequence 400 using the transmitted primary credentials. In step 610, the authenticating entity determines whether or not the user has been initially authenticated based on the primary authentication sequence. For example, the authenticating entity might verify the user's knowledge of the factor(s) using split key asymmetric cryptography techniques, such as those disclosed in the applications identified in the Related applications section above.

If the primary authentication fails, the session login procedure will normally be terminated or, as shown in FIG. 6A, restarted. If the primary authentication is successful, the user has been initially authenticated and, in step 612, the authenticating entity selects and retrieves a predetermine one, e.g. secondary sequence 450, of a plurality of secondary authentication sequences 450-475 from the data store 350. We will refer to the retrieved secondary authentication sequence as the first secondary authentication sequence 450. As noted above, this first secondary authentication sequence might be one pre-selected, either explicitly or by default, by, for example, a manager entity, which could be a distinguished entity or sponsor represented by the optional manager server 60.

In step 615, the authenticating entity receives secondary credentials such as a one-time password (OTP), transmitted from the user via the network 10. We will refer to these received secondary credentials as first secondary credentials. It will be recognized that typically the secondary credentials are received in response to a request for the secondary credentials from the authenticating entity. The retrieval may be performed and the secondary credentials requested after successful initial authentication of the user.

In step 620, the authenticating entity performs, as part of the initial login, the retrieved first secondary authentication sequence 450 using the transmitted first secondary credentials. In step 625, the authenticating entity determines whether or not the user has been secondarily authenticated based on the first secondary authentication sequence. For example, the authenticating entity might verify the user's knowledge of a received OTP in any of various manners, to secondarily authenticate the user based on the received first secondary credentials.

As noted above, each, including the first, of the secondary authentication sequences may be entirely processed within the authentication server, e.g. server 40, or may be referred to an external server (not shown) for processing. For example the value of an OTP could be locally verified on the authentication server 40 or verified by communications with an external server responsible for verifying OTP values. It will be recognized that the system is easily adapted so that some, or all, of the secondary authentication sequences 450-475 are referred by the authentication server to an external server for processing.

It should also be understood that a particular secondary authentication sequence may or may not require direct input from the user. For example, a required user input could be the value of an OTP. Depending on the implementation, this input could be obtained by the authenticating server from the user's device with or without direct input by the user. If the applicable secondary authentication sequence requires the IP address of the user's machine, this information may be obtainable from the protocol itself and therefore not require a direct input by the user. Similarly, information about the security software on the user's PC can be obtained without requiring the user to provide direct input. Also the required input may be communicated to the user through a separate communication channel such as a mobile telephone.

If the first secondary authentication fails, the session login procedure will normally be terminated or, as shown in FIG. 6A, restarted. If it is restarted, the session login procedure could go back to either (i) the start of the primary authentication, or (ii) the start of the secondary authentication using the same retrieved secondary authentication sequence and, if desired, receive/request different secondary credentials, such as a different OTP, for the restarted secondary authentication, or (iii) the start of the secondary authentication, and receive/request different secondary credentials, such as a code of a user's mobile telephone or an IP address, and retrieve and use another different secondary authentication sequence for the restarted secondary authentication. In the exemplary implementation shown in FIG. 6A, the session login procedure goes back to the start of the secondary authentication using the same retrieved first secondary authentication sequence and receives, typically responsive to a second request, different first secondary credentials, such as a different OTP, for the restarted first secondary authentication.

Re-Authentication Protocol

If the primary and secondary authentications in the log-in protocol are performed successfully, the authentication entity, e.g. represented by the authentication server 40, provides multiple different re-authentication protocols 410-425 that may be applied to require re-authentication of a user, e.g. represented by the user device 30, during the logged-in session before a requested action will be carried out.

Accordingly, in step 630, the authenticating entity, e.g. authenticating server 40, monitors the logged-in session based on the re-authentication protocols. In this exemplary implementation, certain of the user's activities as well as the passage of time during the session are monitored based on the re-authentication protocols 410-425. In step 635, a determination is made, based on the monitoring, as to whether or not re-authentication is required. If not, the monitoring continues.

If, in step 635, a determination is made that re-authentication is required, the authenticating entity will perform another secondary authentication. In the exemplary implementation being described, the determination may be based on (i) the password change protocol 410, and the user's request to change the password, (ii) the retrieve information protocol 415 and the user's request to retrieve information stored in the user's account, (iii) the modify information protocol 420 and the user's request to retrieve and modify information stored in the user's account, or (iv) the time expired protocol 425 and the passage of time during a logged-in session.

If re-authentication is deemed to be required, in step 642 the authenticating entity, e.g. represented by authentication server 40, selects and retrieves a predetermine one of a plurality of secondary authentication sequences 450-475 from the data store 350. As noted above, this second secondary authentication sequence might be one pre-selected, either explicitly or by default, by a manager entity, which could, for example, be a distinguished entity or sponsor represented by the optional manager server 60. The secondary authentication sequence 450 may again be retrieved or a different one of the secondary authentication sequences 455-475 may be retrieved. Preferably, the second secondary authentication sequence is selected and retrieved by the authenticating entity based on the correspondence of an ID received by the authenticating entity with an ID 510 in the look-up table 500 shown in FIG. 5. For example, if we assume that the user is seeking to perform a particular activity corresponding to activity identifier ID5, then upon the user requesting to perform this activity, the authenticating entity selects and retrieves sequence 450 for re-authentication association of ID5 with sequence 450 in look-up table 500. In this implementation we will assume that the secondary authentication sequence 450 is again selected and retrieved by the authenticating entity represented by authentication server 40. However, whether the same or a different secondary authentication sequence is selected and retrieved for re-authentication, we will refer to the secondary authentication sequence used for the first re-authorization as the second secondary authentication sequence.

In step 640 the authenticating entity, e.g. authenticating server 40, transmits a request to the user, e.g. the user device 30, for second secondary credentials via the network 10. In step 645, the authenticating entity receives secondary credentials transmitted from the user via the network 10. In this implementation, the second secondary credentials could be the same or a different OTP, since the same secondary authentication sequence 450 is to be executed for re-authentication, but we will assume that the second secondary credentials are a different OTP. It should however be understood that the second secondary credentials could be some other type of credentials, if a different secondary authentication sequence, e.g. secondary authentication sequence 455, will be executed for re-authentication. In any event, we refer to the secondary credentials received for this first re-authentication as second secondary credentials.

In step 650, the authenticating entity performs, for purposes of re-authentication, the retrieved second secondary authentication sequence 450 using the transmitted second secondary credentials. In step 655, the authenticating entity determines whether or not the user has been secondarily authenticated based on the second secondary authentication sequence. For example, the authenticating entity might verify the user's knowledge of a received second OTP in any of various ways, to secondarily authenticate the user based on the received second secondary credentials. As noted above, the second secondary authentication sequence may be entirely processed within the authentication entity, e.g. authenticating server 40, or may be referred to an external server (not shown) for processing.

If the second secondary authentication fails, the session login procedure will normally be terminated or, as shown in FIG. 6B, restarted. If it is restarted, the session login procedure could go back to either (i) the start of the secondary authentication using the same retrieved second secondary authentication sequence and, if desired, receive/request different second secondary credentials, such as a different OTP, for the restarted second secondary authentication, or (ii) the start of the second secondary authentication, and receive/request different type second secondary credentials, such as a code of a user's mobile telephone or an IP address, and retrieve and use another different second secondary authentication sequence for the restarted second secondary authentication. In the exemplary implementation shown in FIG. 6B, the authenticating entity goes back to the start of the re-authentication using the same retrieved second secondary authentication sequence and receives, typically responsive to a second request, different second secondary credentials, such as a different OTP, for the restarted second secondary authentication.

It is worthwhile to highlight that all steps of each required secondary authentication sequence, whether for initial login or re-authentication, must succeed in order for the overall authentication to succeed. Some of the steps may be grouped together as an OR group, wherein only one of the group has to succeed. However, within the OR group the steps will be attempted in the order specified.

Users are generally given multiple attempts to perform successful authentication since simple typing and reading errors can result in authentication failure. At the same time, allowing frequent retries can result in leaking valuable information to an attacker, such as a man-in-the-middle (MITM) attacker. The rate at which retries can be attempted must therefore be limited using any suitable technique, a number of which will be familiar to those knowledgeable in this art. This need to limit retries applies to initial authentication and to secondary authentication, whether for session login or re-authentication. Retries could be limited to a single retry cycle, wherein each failure requires the process to resume at the start point. Alternatively, retries could be carried out by repeating the required transmission of credentials and verification, after a failure to secondarily authentic for initial login or re-authenticate based on a secondary authentication sequence.

Exemplary Implementation of Application-Centric (Authenticating Gateway) Flexible Secondary Authentication In this implementation, the networked system includes an authenticating gateway, which is represented in FIG. 1 by the optional gateway server 50. Because the gateway entity will perform the authentications for the servers 40-43, the servers 40-43 will be referred to as information servers in this implementation. The authentication gateway server 50, could for example also be a sponsor or distinguished entity server. If so, the authenticating gateway entity would be represented by the same network device, as the sponsor or distinguished entity and servers 50 and 60 could be combined as a single server. The authenticating gateway entity could be co-resident with an information entity, e.g. a merchant or bank, in which case the authentication gateway server 50 and an information server, e.g. information server 40, could be combined as a single server. Having the two co-resident makes it easier to deploy, reduces hardware requirements and allows for easier sharing of secondary authentication related information among the two. Having the two separate allows the authentication gateway server to be modified and new features integrated therein without being tightly coupled in the product cycle with the information server.

Because multiple different secondary authentication sequences 450-475 are stored at the data store 350 of the gateway server 50, the server has available a number of different secondary authentication sequences, any of which it can be requested to select, or it can select based on other than a request, e.g. based on the rules 480, 485 and/or 490, to be used to authenticate a user for the first time, i.e. via the initial login protocol, to establish a new authenticated session, which is sometimes referred to as a new login session, or for a second or later time, i.e. via the re-authenticate protocol, to again authenticate the user during an existing session. For each user and each of the login and re-authentication protocols one or more manager entities, which may be represented on the network by a manager server 60 or by the information servers 40-43, are authorized to specify a sequence for a required secondary authentication. This sequence is preferably specified, explicitly or by default, when the user account is first created and may be subsequently modified.

As noted above, for each user the authentication gateway server 50 may select different forms of secondary authentication, whether it is desired that the selection be based on the user identity, the activity, the identity of another entity, or some other factor. Thus, the authentication gateway server is sufficiently flexibility to handle whatever forms or degrees of secondary authentication may be desired for each user.

Session Login Protocol

Figure 7A:
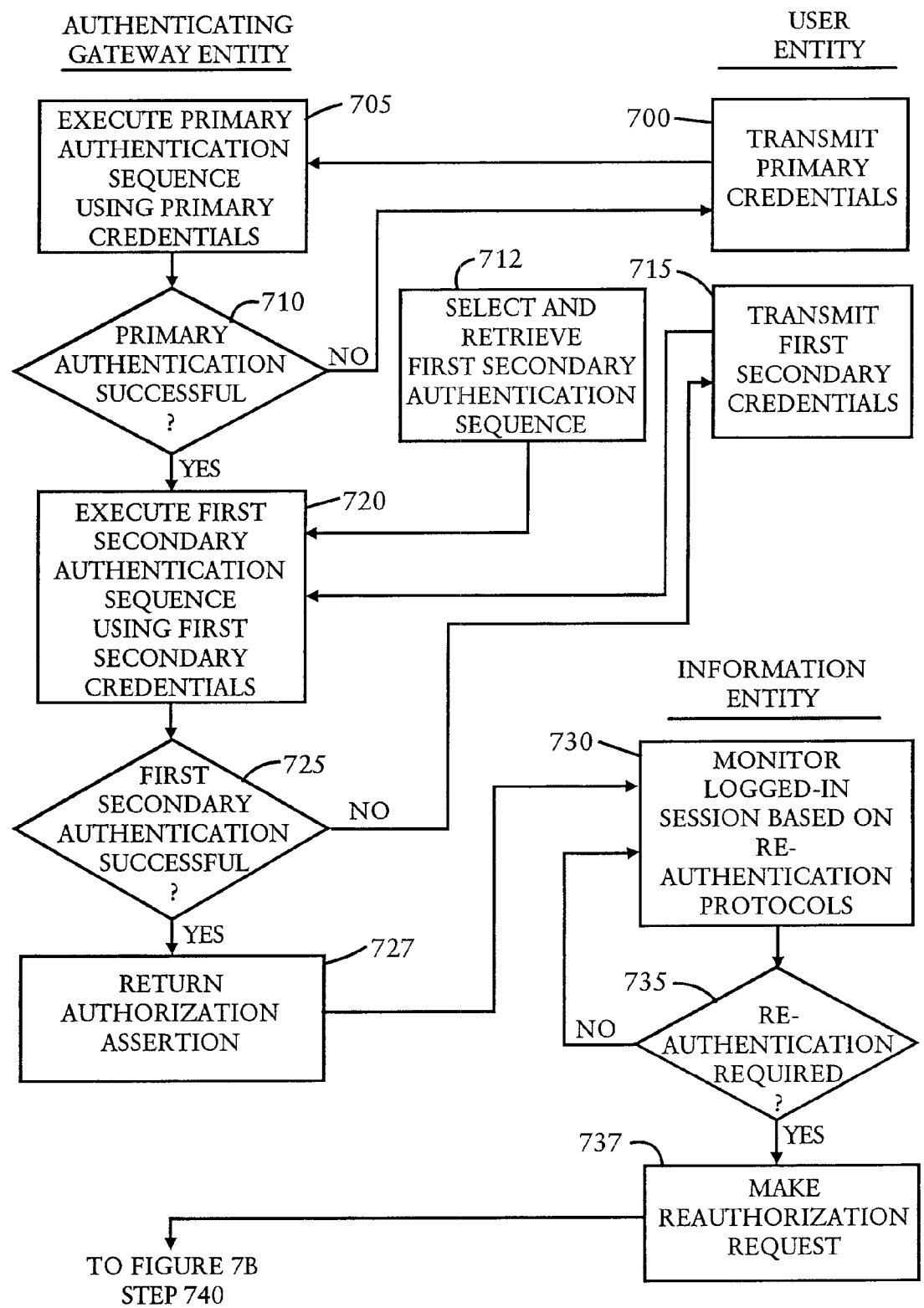
FIGS. 7A-7B depict operations of networked devices shown in FIG. 1, in accordance with another implement the present invention.
Figure 7B:
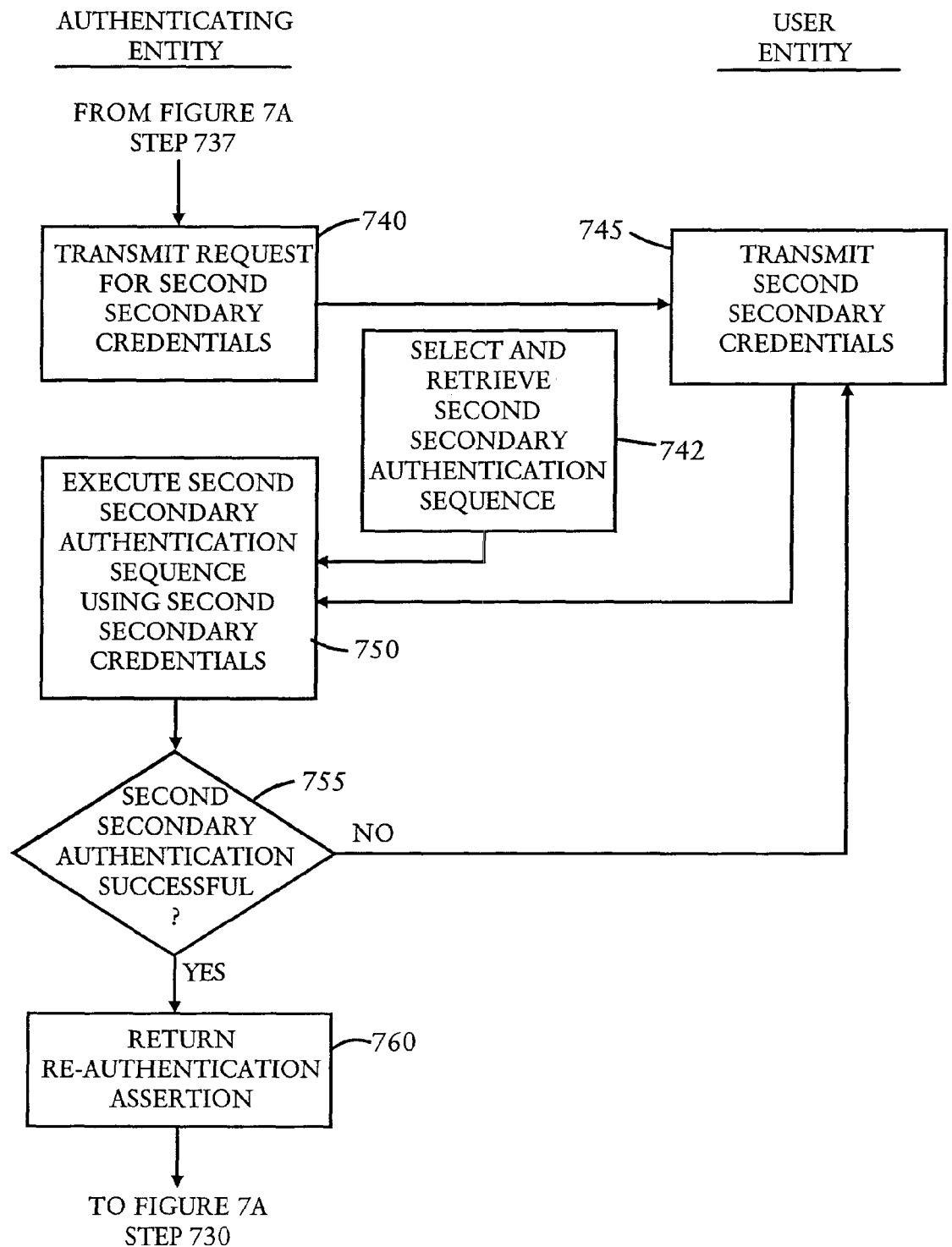

Turning now to FIGS. 7A and 7B, in step 700 an authenticating gateway entity, represented for example by authenticating gateway server 50, receives primary credentials transmitted via the network 10 from the user, represented for example by a user network device 30, such as a personal computer (PC) executing a browser application, as part of an initial login, e.g. the session login protocol. For example, when the user attempts to login to the applicable information server, the user may be redirected from the applicable information server to the gateway entity, as part of an initial login, e.g. the session login. The request to authentication could be made by the familiar process of web re-direction, wherein the user's browser is redirected from the applicable information entity network site to the authentication gateway entity network site, without knowledge or perception of the user. It will however also be recognized that, if desired, the applicable information entity, represented for example by information server 40, could receive the primary credentials transmitted via the network 10 from the user, and the authenticating gateway entity could then receive the primary credentials transmitted via the network 10 or some other communications link from the applicable information entity. Preferably, the information and the authentication servers use an industry standard protocol such as Security Assertion Markup Language (SAML) for communication. In any event, the primary credentials could, for example, be a factor corresponding to the user's password and/or other factors necessary to construct a private or public key of an asymmetric crypto-key, and preferably a split asymmetric crypto-key, associated with the user.

In step 705, the authenticating gateway entity performs a primary authentication sequence 400 using the transmitted primary credentials. In step 710, the authenticating gateway entity determines whether or not the user has been initially authenticated based on the primary authentication sequence. For example, the authenticating gateway entity might verify the user's knowledge of the factor(s) using split key asymmetric cryptography techniques, such as those disclosed in the applications identified in the Related applications section above.

If the primary authentication fails, the session login procedure will normally be terminated or, as shown in FIG. 7A, restarted. If the primary authentication is successful, the user has been initially authenticated and, in step 712 the authenticating gateway entity selects and retrieves a predetermine one, e.g. secondary sequence 450, of a plurality of secondary authentication sequences 450-475 from the data store 350. The gateway entity may or may not, as may be desired, transmit an indication that the initial authentication was successful or unsuccessful to the applicable information entity, e.g. information server 40. We will refer to the retrieved secondary authentication sequence as the first secondary authentication sequence 450. As noted above, this secondary authentication sequence might be one pre-selected, either explicitly or by default, by a manager entity, which could be represented by the applicable one of the information servers 40-43 or, if the manager entity is a distinguished entity or sponsor, by the optional manager server 60. For example, the selected secondary authentication sequence might be one selected based on the identity of the user, or whether the secondary authentication is for login or some other purpose, such as for access to particular information or for post login re-authentication, etc.

In step 715, the authenticating gateway entity receives secondary credentials such as a one-time password (OTP), transmitted from the user via the network 10. We will refer to these received secondary credentials as first secondary credentials. It will be recognized that typically the secondary credentials are received in response to a request for the secondary credentials from the authenticating entity. The retrieval may be performed and the secondary credentials requested after successful initial authentication of the user.

In step 720, the authenticating gateway entity performs, as part of the initial login, the retrieved first secondary authentication sequence 450 using the transmitted first secondary credentials. In step 725, the authenticating entity determines whether or not the user has been secondarily authenticated based on the first secondary authentication sequence. For example, the authenticating entity might verify the user's knowledge of a received OTP in any of various ways to secondarily authenticate the user based on the received first secondary credentials. The authenticating gateway entity will typically transmit an indication that the secondary authentication was successful or unsuccessful to the applicable information entity, e.g. information server 40.

As noted above, each, including the first, of the secondary authentication sequences may be entirely processed within the authentication gateway server, e.g. server 50, or may be referred to an external server for processing. That is, the value of an OTP could be locally verified on the authentication gateway server 50 or verified by communications with the applicable one of the information servers 40-43, or with a special external server (not shown) responsible for verifying OTP values.

As an example, if the secondary authentication sequence authenticates based on a one-time password (OTP), its value can be obtained and verified by the authentication gateway entity itself or by reference to an external verifier. On the other hand, if the secondary authentication is to be based on a code communicated to the user's mobile telephone, the authentication gateway entity may need to obtain the user's phone number from the applicable information entity, whereas it can handle the rest of the process itself. In this latter example the authentication gateway entity must either be co-resident and closely coupled, e.g. via an appropriate communications link, with the information entity, or it must have a manager account with the information entity, e.g. server 40, to be able to access the phone number from the user's record on the information server 40. Thus, interaction with the information server 40 may require the authentication gateway server 50 to maintain a login session for a suitable manager account on the information server 40, e.g. to obtain the user's mobile phone number etc. In any event, it will be recognized that the system is easily adapted so that some, or all, of the secondary authentication sequences 450-475 are referred by the authenticating gateway entity, e.g. represented by authentication gateway server 50 to such an external server for processing.

It should also be understood that a particular secondary authentication sequence may or may not require direct input from the user. For example, a required user input could be the value of an OTP. Depending on the implementation, this input could be obtained by the authenticating server from the user's device with or without direct input by the user. If the applicable secondary authentication sequence requires the IP address of the user's machine, this information may be obtainable from the protocol itself and therefore not require a direct input by the user. Similarly, information about the security software on the user's PC can be obtained without requiring the user to provide direct input. Also the required input may be communicated to the user through a separate communication channel such as a mobile telephone.

If the first secondary authentication is successful, the session login procedure, executed by the authenticating gateway entity, e.g. represented by the authentication gateway server 50, will normally return a SAML or other industry standard authentication assertion to the information entity, e.g. represented by the information server 40, by redirecting the user back to the information entity, e.g. the information server 40 website, as shown in step 727. If the first secondary authentication fails, the session login procedure will normally be terminated or, as shown in FIG. 7A, restarted. If it is restarted, the session login procedure could go back to either (i) the start of the primary authentication, or (ii) the start of the secondary authentication using the same retrieved secondary authentication sequence and, if desired, request/receive different secondary credentials, such as a different OTP, for the restarted secondary authentication, or (iii) the start of the secondary authentication, and request/receive different secondary credentials, such as a code of a user's mobile telephone or an IP address, and retrieve and use another different secondary authentication sequence for the restarted secondary authentication. In the exemplary implementation shown in FIGS. 7A and 7B, the session login procedure goes back to the start of the secondary authentication using the same retrieved first secondary authentication sequence and receives, typically responsive to a second request, different first secondary credentials, such as a different OTP, for the restarted first secondary authentication.

Re-Authentication Protocol

If the primary and secondary authentications in the log-in protocol are performed successful, the authentication gateway entity, e.g. represented by the authentication gateway server 50, provides multiple different re-authentication protocols 410-425 that may be applied to require re-authentication of a user, e.g. represented by the user device 30, during the logged-in session before a requested action will be carried out.

Accordingly, in step 730, the information entity, e.g. information server 40, monitors the logged-in session based on the re-authentication protocols. In this exemplary implementation, certain of the user's activities as well as the passage of time during the session are monitored based on the re-authentication protocols 410-425. In step 735, a determination is made by the information entity, based on the monitoring, as to whether or not re-authentication is required. If not, the monitoring continues.

If, in step 735, a determination is made that re-authentication is required, the authenticating gateway entity will perform another secondary authentication. For example, after the information entity, e.g. represented by information server 40, determines that re-authorization is required, in step 737 the information entity requests reauthorization, e.g. by redirecting the user to the authenticating entity, e.g. to the authenticating gateway server 50. In the exemplary implementation being described, the determination may be based on (i) the password change protocol 410, and the user's request to change the password, (ii) the retrieve information protocol 415 and the user's request to retrieve information stored in the user's account, (iii) the modify information protocol 420 and the user's request to retrieve and modify information stored in the user's account, or (iv) the time expired protocol 425 and the passage of time during a logged-in session.

If re-authentication is requested, such as by the information entity redirecting the user to the authenticating gateway entity during the session, in step 742 the authenticating gateway entity, e.g. represented by authenticating gateway server 50, selects and retrieves a predetermine one of a plurality of secondary authentication sequences 450-475 from the data store 350. As noted above, this second secondary authentication sequence might be one pre-selected, either explicitly or by default, by a manager entity, which could, for example, be represented by the applicable information server, e.g. information server 40 or, if the manager entity is a distinguished entity or sponsor, by the optional manager server 60. The secondary authentication sequence 450 may again be retrieved or a different one of the secondary authentication sequences 455-475 may be retrieved.

Preferably, the second secondary authentication sequence is selected and retrieved by the authenticating gateway entity based on the correspondence of an ID received by the authenticating gateway entity with an ID 510 in the look-up table 500 shown in FIG. 5. For example, if we assume that the user is seeking to perform a particular activity corresponding to activity identifier ID5, then upon the user requesting to perform this activity, the applicable information entity, e.g. represented by information server 40, redirects, via the network 10, the user, along with an indication of the user's request to perform that particular activity, e.g. the identifier ID5, to the authenticating gateway entity. The authenticating gateway entity selects and retrieves secondary authentication sequence 450 for re-authentication based on matching the indication from the information entity, e.g. the identifier ID5, to ID5 in the look-up table 500, and the association of ID5 with sequence 450 in look-up table 500. In this implementation we will assume that the secondary authentication sequence 450 is again selected and retrieved by the authenticating gateway entity represented by authentication gateway server 50. However, whether the same or a different secondary authentication sequence is selected and retrieved for re-authentication, we will refer to the secondary authentication sequence used for the first re-authorization as the second secondary authentication sequence.

In step 740 the authenticating gateway entity, e.g. authenticating server 50, transmits a request to the user, e.g. represented by the user device 30, for second secondary credentials via the network 10. In step 745, the authenticating entity receives secondary credentials transmitted from the user via the network 10. It should be understood that, if desired, the re-authentication protocol could be such that these secondary credentials are received by the authenticating gateway entity without the need for an explicit request for secondary credentials from the authenticating gateway entity to the user. In this implementation, the second secondary credentials could be the same or a different OTP, since the same secondary authentication sequence 450 is to be executed for re-authentication, but we will assume that the second secondary credentials are a different OTP It should however be understood that the second secondary credentials could be some other type of credentials, if a different secondary authentication sequence, e.g. secondary authentication sequence 455, will be executed for re-authentication. In any event, we refer to the secondary credentials received for this first re-authentication as second secondary credentials.

In step 750, the authenticating gateway entity performs, for purposes of re-authentication, the retrieved second secondary authentication sequence 450 using the transmitted second secondary credentials. In step 755, the authenticating gateway entity determines whether or not the user has been secondarily authenticated based on the second secondary authentication sequence. For example, the authenticating entity might verify the user's knowledge of a received second OTP in any of various ways, to secondarily authenticate the user based on the received second secondary credentials. As noted above, the second secondary authentication sequence may be entirely processed within the authentication gateway entity, e.g. authenticating gateway server 50, or may be referred to an external server for processing.

If the second secondary authentication is successful, in step 760 the re-authentication procedure, executed by the authenticating gateway entity, e.g. represented by the authentication gateway server 50, will cause the return of a SAML or other industry standard authentication assertion to the information entity, e.g. represented by the information server 40, by redirecting the user back to the information entity, e.g. the information server 40 website. If the second secondary authentication fails, the session login procedure will normally be terminated or, as shown in FIG. 7B, restarted. If it is restarted, the session login procedure could go back to either (i) the start of the secondary authentication using the same retrieved second secondary authentication sequence and, if desired, receive/request different second secondary credentials, such as a different OTP, for the restarted second secondary authentication, or (ii) the start of the second secondary authentication, and request/receive different type second secondary credentials, such as a code of a user's mobile telephone or an IP address, and retrieve and use another different second secondary authentication sequence for the restarted second secondary authentication. In the exemplary implementation shown in FIG. 7B, the authenticating entity goes back to the start of the re-authentication using the same retrieved second secondary authentication sequence and receives, typically responsive to a second request, different second secondary credentials, such as a different OTP, for the restarted second secondary authentication.

It is worthwhile to highlight that all steps of each required secondary authentication sequence, whether for initial login or re-authentication, must succeed in order for the overall authentication to succeed. Some of the steps may be grouped together as an OR group, wherein only one of the group has to succeed. However, within the OR group the steps will be attempted in the order specified.

Users are generally given multiple attempts to perform successful authentication since simple typing and reading errors can result in authentication failure. At the same time, allowing frequent retries can result in leaking valuable information to an attacker, such as a man-in-the-middle (MITM) attacker. The rate at which retries can be attempted must therefore be limited using any suitable technique, a number of which will be familiar to those knowledgeable in this art. This need to limit retries applies to initial authentication and to secondary authentication, whether for session login or re-authentication. Retries could be limited to a single retry cycle, wherein each failure requires the process to resume at the start point. Alternatively, retries could be carried out by repeating the required transmission of credentials and verification, after a failure to secondarily authenticate for initial login or re-authenticate based on a secondary authentication sequence.

Having a common authentication gateway is beneficial in consolidating the authentication service in one place and not having to deploy it at multiple information servers. Also the manager accounts required for the authentication gateway entity to provide the service are localized in the gateway instead of requiring instantiation at each information server.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. in providing secure authentication for Internet or other network communications, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

We claim:

1. A method for authenticating a user of a communications network, comprising:
   centrally receiving, as part of the initial login protocol, primary credentials from the user;
   performing, as part of the initial login protocol, a primary authentication sequence to initially authenticate the user based on the received primary credentials;
   retrieving a first secondary authentication sequence from a plurality of retrievable secondary authentication sequences;
   centrally receiving first secondary credentials from the user as part of an initial login protocol for a session;
   performing the retrieved first secondary authentication sequence to authenticate the user based on the received first secondary credentials as part of the initial login protocol;
   retrieving a second secondary authentication sequence from the plurality of retrievable secondary authentication sequences;
   transmitting a request for second secondary credentials if the primary authentication sequence is performed successfully but the first secondary authentication sequence is performed unsuccessfully;
   centrally receiving the second secondary credentials in response to the transmitted request; and
   performing the retrieved second secondary authentication sequence to secondarily authenticate the user based on the second secondary credentials received in response to the request.

2. The method according to claim 1, wherein:
   the user is associated with an asymmetric crypto-key, including a private key and a public key, with the private key having a first private key portion and a second private key portion, and with the first private key portion constructed from at least one of a factor corresponding to the user's password and one or more other factors;
   the primary credentials are the first private key portion;
   the first private key portion is received as a signature on a partially signed message;
   the performance of the primary authentication sequence includes applying the second private key portion to complete the signature on the received partially signed message; and
   the user is initially authenticated based on the received primary credentials only if completion of the signature results in recovery of the message.

3. The method according to claim 1, further comprising:
   centrally receiving, from an entity other than the user, verifying secondary credentials information;
   wherein the performed second secondary authentication sequence secondarily authenticates the user based also on the received verifying secondary credentials information.

4. The method according to claim 3, wherein:
   the first secondary credentials are a one-time password and the first secondary authentication sequence verifies one-time passwords; and
   the second secondary credentials are other than a one-time password and the second secondary authentication sequence verifies other than one-time passwords.

5. The method according to claim 1, further comprising:
   receiving, from an entity other than the user, a designation of one of the plurality of retrievable authentication sequences;
   wherein the retrieved first secondary authentication sequence is the one of the plurality of retrievable authentication sequences designated in the received designation.

6. The method according to claim 1, wherein:
   the received first secondary credentials include a one time password.

7. The method according to claim 6, wherein:
   the performance of the first secondary authentication sequence includes validating the received one-time password to first secondarily authenticate the user.

8. The method according to claim 1, further comprising:
   centrally receiving, from an entity other than the user, verifying credentials information;
   wherein the performed first secondary authentication sequence authenticates the user based also on the received verifying credentials information.

9. The method according to claim 1, wherein:
   the first secondary credentials are a one-time password; and
   the second secondary credentials are other than a one-time password.

10. A network server for authenticating a user of a communications network, comprising:
    a communications interface for receiving primary credentials and first secondary credentials as part of an initial login protocol from the user; and
    a processor configured to (i) retrieve a first secondary authentication sequence from a plurality of retrievable secondary authentication sequences, (ii) perform a primary authentication sequence to initially authenticate the user based on the received primary credentials and (iii) perform the retrieved first secondary authentication sequence to secondarily authenticate the user based on the received first secondary credentials as part of the initial login protocol;
    wherein the communications interface is also for (i) transmitting a request for second secondary credentials if the primary authentication sequence is performed successfully but the first secondary authentication sequence is performed unsuccessfully, and (ii) receiving the second secondary credentials in response to the transmitted request; and
    the processor is further configured to (i) retrieve a second secondary authentication sequence from the plurality of retrievable secondary authentication sequences, and (ii) perform the retrieved second secondary authentication sequence to secondarily authenticate the user based on the second secondary credentials received in response to the request.

11. The network server according to claim 10, wherein:
    the communications interface is also for receiving, from an entity other than the user, verifying secondary credentials information; and
    the performed second secondary authentication sequence secondarily authenticates the user based also on the received verifying secondary credentials information.

12. The network server according to claim 10, wherein:
    the communications interface is also for receiving, from an entity other than the user, a designation of one of the plurality of retrievable secondary authentication sequences; and
    the retrieved first secondary authentication sequence is the one of the plurality of retrievable authentication sequences designated in the received designation.

13. The network server according to claim 10, wherein:

the communications interface is also for receiving, from an entity other than the user, verifying credentials information; and the performed first secondary authentication sequence secondarily authenticates the user based also on the received verifying credentials information.

14. The network server according to claim 10, wherein:

the communications interface is also for (i) receiving, from an entity other than the user prior to beginning the initial login protocol, a first designation of one of the plurality of retrievable secondary authentication sequences, and (ii) receiving, from the other entity, a second designation of another of the plurality of retrievable secondary authentication sequences;

the processor is further configured to retrieve the second secondary authentication sequence from the plurality of retrievable secondary authentication sequences based on the received second designation;

the processor is further configured to retrieve the first secondary authentication sequence from the plurality of retrievable secondary authentication sequences based on the received first designation; and the second secondary credentials are of a different type than the first secondary credentials.

15. A networked system for authenticating a user of a communications network, comprising:

a user network device configured to transmit primary credentials and first secondary credentials of the user as part of an initial login protocol; and an authenticating entity network station configured to (i) retrieve a first secondary authentication sequence from a plurality of retrievable secondary authentication sequences, (ii) perform a primary authentication sequence to initially authenticate the user based on the received primary credentials, and (iii) perform the retrieved first secondary authentication sequence to secondarily authenticate the user based on the transmitted first secondary credentials as part of the initial login protocol;

wherein the authenticating entity network station is further configured to (i) retrieve a second secondary authentication sequence from the plurality of retrievable secondary authentication sequences and (ii) transmit a request for secondary credentials, if the primary authentication sequence is performed successfully but the first secondary authentication sequence is performed unsuccessfully;

the user network device is further configured to transmit second secondary credentials of the user in response to the transmitted request; and the authenticating entity network station is further configured to perform the retrieved second secondary authentication sequence to secondarily authenticate the user based on the second secondary credentials transmitted in response to the request.

16. The networked system according to claim 15, further comprising:

a third entity network station configured to transmit verifying secondary credentials information;

wherein the performed second secondary authentication sequence secondarily authenticates the user based also on the transmitted verifying secondary credentials information.

17. The networked system according to claim 15, further comprising:

a third entity network station configured to transmit a designation of one of the plurality of retrievable secondary authentication sequences;

wherein the retrieved first secondary authentication sequence is the one of the plurality of retrievable secondary authentication sequences designated in the received designation.

18. The networked system according to claim 15, further comprising:

a third entity network station configured to transmit verifying credentials information;

wherein the performed first secondary authentication sequence authenticates the user based also on the transmitted verifying credentials information.

19. The networked system according to claim 15, wherein:

a third entity network station configured to (i) transmit, prior to beginning the initial login protocol, a first designation of one of the plurality of retrievable secondary authentication sequences and (ii) transmit a second designation of another of the plurality of retrievable secondary authentication sequences;

the authenticating entity network station is further configured to (i) retrieve the first secondary authentication sequence from the plurality of retrievable secondary authentication sequences based on the transmitted first designation, and (ii) retrieve the second secondary authentication sequence from the plurality of retrievable secondary authentication sequences based on the transmitted second designation; and the second secondary credentials are of a different type than the first secondary credentials.

* * * * *